United States Patent [19]

Eilentropp

[11] Patent Number: 4,791,966
[45] Date of Patent: Dec. 20, 1988

[54] WRAPPED, ELONGATED STOCK

[75] Inventor: Heinz Eilentropp, Wipperfürth, Fed. Rep. of Germany

[73] Assignee: HEW-Kabel Heinz Eilentropp KG, Wipperfuerth, Fed. Rep. of Germany

[21] Appl. No.: 483,549

[22] Filed: Apr. 11, 1983

[30] Foreign Application Priority Data

Apr. 20, 1982 [DE] Fed. Rep. of Germany ....... 3214447

[51] Int. Cl.$^4$ ............................................. F16L 11/12
[52] U.S. Cl. .................... 138/154; 138/129; 138/122; 138/DIG. 3; 174/110 FC
[58] Field of Search ............... 138/129, 144, 150, 154, 138/DIG. 3, 122; 174/110 FC, 118; 428/35, 36

[56] References Cited

U.S. PATENT DOCUMENTS

| 473,943 | 5/1892 | Meneely | 138/154 |
|---|---|---|---|
| 1,977,775 | 10/1934 | Patterson | 138/129 X |
| 2,484,484 | 10/1949 | Berry | 138/DIG. 3 |
| 2,781,552 | 2/1957 | Gray | 138/DIG. 3 |
| 2,783,173 | 2/1957 | Walker et al. | 138/DIG. 3 |
| 2,785,700 | 3/1957 | Yovanovich | 138/154 X |
| 3,054,710 | 9/1962 | Nixon | 174/110 FC X |
| 3,122,171 | 2/1964 | Britton et al. | 138/129 |
| 3,323,553 | 6/1967 | Richitelli et al. | 138/122 |
| 3,887,761 | 6/1975 | Gore | 174/110 FC X |
| 3,919,026 | 11/1975 | Mizutani et al. | 138/127 X |
| 4,196,755 | 4/1980 | Rutnyak et al. | 138/154 X |
| 4,350,547 | 9/1982 | Kanao | 138/144 X |

FOREIGN PATENT DOCUMENTS

| 296054 | 5/1932 | Italy | 138/154 |
|---|---|---|---|
| 28122 | of 1898 | United Kingdom | 138/144 |

Primary Examiner—James E. Bryant, III
Attorney, Agent, or Firm—Ralf H. Siegemund

[57] ABSTRACT

A ribbon, preferably made of polytetrafluoroethylene and preferably in an unsintered configuration but having lens or trapezoidal cross section is used for wrapping elongated stock such as electrical conductors, tubes, or a removable mandrel, the wrapping to be made with overlapping edges followed by fusion to obtain a coherent tubular configuration.

11 Claims, 1 Drawing Sheet

WRAPPED, ELONGATED STOCK

BACKGROUND OF THE INVENTION

The present invention relates to a ribbon to be used for wrapping, possibly for insulating purposes, and to be made of a synthetic material which is highly resistive against high temperature.

Ribbon of the type to which the invention pertains are known, for example, for electrically insulating electrical conductors. U.S. Pat. No. 3,408,453 describes such a ribbon to be made for example of polytetrafluoroethelene or PTFE for short. Such ribbons may be wrapped, for example, helically and directly upon electrical conductors. The outwardly facing side of such ribbons are for example, bonded upon a second lay of such a ribbon or one may use welding for interconnecting these ribbons. Basically, of course, the ribbon has a rectangular cross section. Particularly in the case of insulation complete coverage of the electrical conductor is necessary and this can be insured only if the ribbon overlaps in adjacent loops. This, however, introduces inherently a certain unevenness, the wrapped surface is no longer smooth but exhibits steps. A point to be considered in this regard, is that the step configuration introduced by the ribbon overlap establishes points on which external forces can act and if these forces are not exactly in radial alignment with the cylindrical configuration, force components may exist tending to tear the insulation off. It can readily be seen that this possibility constitutes a danger, particularly in those cases when the conductor is used for heating purposes or for measuring or tests purposes. Considering such an environment, a cable or conductor insulated in the described fashion may be subjected to high external temperatures, as well as to moisture or even chemically aggressive fluids. The more severe these environmental conditions are, the more crucial it becomes to have a smooth and homogenic outer surface of the insulated conductor so that any gap and open path to the conductor proper will not exist nor will be created with certainty.

For the known cable one can obtain these protective features and aspects by wrapping a particularly constructed ribbon around the polytetrafluoroethelene ribbon layer and bond or weld this additional ribbon thereto. Of course, this constitutes an additional expenditure, and does not eliminate the basic problem outlined above, namely the formation of edges or steps at overlapping ribbon loops. Thus, one may say that possibly any damage through mechanical wear is delayed at best. A first of one layer may be torn open with impunity, but the layer underneath now being exposed can be subjected to tear at a later time. Therefore, thus wrapping more layers of ribbon around the basic conductor does not eliminate the problem, it merely may delay the occurrence of damage.

In order to avoid these difficulties, it was deemed necessary to avoid the technique of ribbon wrapping and to insulate an electrical conductor directely through extrusion or the like in a continuous process, thereby producing indeed a smooth surface of continuous insulation. The procedure is analogous to jacketing a tube. This method is widely used particularly for applying a layer of thermoplastic or elastomeric material to a conductor, the material having a relatively low melting range. The extrusion and method of continuously applying a layer to the conductor is, however, not suitable if the layer material has a higher melting range, because the forming process becomes too difficult. One has instead used a sintering method for making compact insulation, but here is a decisive disadvantage that the material particles are orientedly predominantly in axial direction and that limits utilization of conductors insulated in this fashion. Moreover, sintering methods frequently does not establish a completely concentric arrangement of conductor and layer. Another disadvantage of the sintering method is that the length of the conductors to be treated in this manner is limited because the machinery providing the requisite pressing are comparatively small. Also it was found that particularly in the case of extruding a single layer insulation may produce occasionally local defects. Of course, extrusion is limited to the processing of concentric conductors.

The various considerations outlined above with reference to electrical cable and conductor are also applicable in many instances for the making of tubes. A particular field of employment are, for example, heat exchanger tubes for conducting aggressive media as disclosed, for example in German printed Pat. No. 8,106,819 using as basic material a metal tube, for example a copper tube and being jacketed with a fluoride containing synthetic such as the above-mentioned polypetrafluoroethelene. These jackets are made individually in forms of hoses in a so called piston extruder. Again, the material texture is predominantly oriented in longitudinal direction, and in the case of alternating thermo loads longitudinal cracks may readily occur in the wall of the hose. Such cracks, of course, may ultimately damage the heat exchanger to such a extent that it is no longer usable. This is even more important if the heat exchanger is used for heating aggressive electrolytic or strongly oxidizing acids.

The so called piston extrusion permits also the making of protective hoses from polytetrafluorethelene, but the piston extrustion can also be used to make tubes directly to be used for conducting a fluid medium. See for example German printed patent application No. 3,104,037. Aside from the fact that just as in the case of cable and conductor, the length to be processed in one run is limited it was found difficult to process tubes of larger diameter in this manner. In accordance with the known method, therefore, larger tubes are made from strips or parts of a number of smaller tubes which are joined through an internal mandral and bonded to each other in a melted state. For reasons above, this method is not suitable nor economically feasible for making PTFE tubes of larger cross sections and/or indefinite lengths.

DESCRIPTION OF THE INVENTION

In view of the aforedescribed state of the art, it is an object of the present invention to provide a wrapping for electrical cable conductors, tubes, hoses or other profiles and sections, or for providing self-contained hoses which are free from the numerous deficiencies outlined above, resist high temperature, permit protection against the effect of chemically aggressive media and insure proper operation of function of or within whatever they envelope.

In accordance with the preferred embodiment of the present invention, it is suggested to provide a wrapping around elongated stock under utilization of a high-temperature-resisting synthetic ribbon having a cross section which is relatively thick in its central part but tapers gradually towards the edges; for example, the cross section deviates from a rectangular one by a lens or trapezoidal configuration. The ribbon has a maximum thickness from 30 to 300 micrometers, preferable between 60 and 180 micrometers. The ribbons are 4 to 50 mm wide, preferably 10 to 30 mm.

Such a tape, when wrapped around a cable, a conductor, a tube, a mandrel or the like, permits the production of a cover for such stock which, aside from being resistive to high thermal loads has a smooth surface, quite comparable with a surface obtainable by extrusion. Most importantly, the resulting jacket cover or layer does not offer any pronounced point of attack for any external force which may cause the cover to tear. If compared with the usual direct application of insulation through powder pressing and sintering for purposes of providing a temperature resisting insulation, the invention permits a much more rapid manufacturing speed which moreover is independent from the length of the stock to be covered. Moreover, wrapping in accordance with the present invention enhances the quality of insulation generally, as compared with the conventional powder press sinter method or piston extrusion; there is no preferred direction of orientation of the material particles. Therefore, this particular source of problems is avoided by practicing the invention, i.e. by wrapping a ribbon, rather than applying a cover directly under conditions of a process which inherently produces organized alighment of particles resulting in tears.

The process of wrapping different ribbons at different orientations and in a plurality of layers around elongated stock produces an overall isotropic characteristic distribution in material behavior which is statistically clearly approaching random orientation and therefore maximizes, for example, aspects and characteristics of strength and also maximizes electrical properties requiring isotrop in direct relation to random alignment of particles.

Another aspect to be considered is the requirement that a conductor should be concentrically disposed within its insulated cover. Wrapping a conductor into a ribbon in the stated manner eliminates any eccentricity of and within the insulation. On the other hand, the wrapping process is not dependent upon absolute roundness and circularity in cross section of the item being wrapped. In the case of extrusion, it is quite common that the object upon which an extrudite layer is applied has to be very accurately round and it has to be run through a round extrusion nozzle in strict concentric relation thereto. The ribbon technique in accordance with the present invention is basically independent from any geometric constraint concerning the cross section of the item being wrapped.

It is a particular feature of the present invention that the object upon which the ribbons are applied does not have to stay with the wrapping; rather if it is a mandrel, it can be removed so that a self-contained and self-supporting hose is produced, particularly if multiple layers are wrapped one upon the other. This technique is of interest in the case of a ribbon which is not sintered when applied, but following the wrapping a sintering process is applied for fusing overlapping edges as well as superimposed layers with each other. In the case of using the wrapping process as a cover, the most important objects to be covered from an application point of view are electrical conductors and cables on one hand and tubes on the other hand. The wrapping can be used to provide primary electrical insulation upon a bare conductor or a conductor bundle in order to provide an insulation which is also chemical resisting and resitant to chemical aggression, bearing in mind that the inventive cover is constructed to insure absolute tightness. However, the method can also be provided to cover an already insulated conductor or even a cable or cable bundle, with a layer which is to have high temperature resistance and is absolutely leak proof by and for surface homogeneity. In the case of a tube to be covered, the advantages are analogous.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings. FIG. 1 illustrates on an enlarged scale a ribbon 1 having a lense shaped cross section with smooth surface. The comparatively small range a in the central portion of the ribbon has, for example, a thickness from 80 to 150 micro meters and the larger boundary ranges b gradually reduce the thickness to the edges 2 which may have a thickness of 5 microns or even less. The ribbon is from 10 to 30 mm wide (2b+a).

FIG. 2 illustrates a modified version which may be more suitable and may ensure a more even wrapping surface, but is somewhat more difficult to make. This ribbon 3 has a larger (wider) range a' in the central portion and is of uniform thickness. That range may, for example be from 30 to 200 micrometers. The overall configuration, therefore, is that of a trapeze, and the smaller boarder regions b' run towards edges 4 which again may have a thickness in the order of 5 microns or even less.

FIG. 3 illustrates a double lense cross section for a ribbon 5 and one can again define a central region of large thickness, a" and relatively wide boarder region b". The dimensions may roughly be the same as outline above the reference to FIG. 1.

Figure 1:
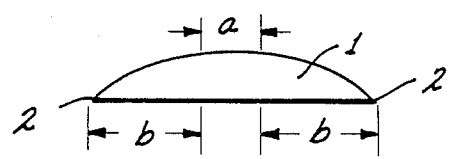
FIG. 1 is a cross section of a ribbon to be used in accordance with the preferred embodiment of the present invention.

It can readily be seen that generally speaking in each of the cases, ribbon made in accordance with the several examples, is used upon wrapping to obtain overlapping border regions of reduced thickness cooperating with a complimentary configuration of the ribbon edge of the adjoining loop. By selecting the overlap commensurate with the geometry of the ribbon one can provide a practically stepless transition from loop to loop with a corresponding stepless configuration of ribbon material as a whole.

Particular ranges were given above, but it can be said that the ribbon should be at least about 30 micron thick while a maximum thickness in excess of 200 microns was found to be impractical. The ribbon may, for example, be made of a synthetic which cannot be worked from a melt and is unsintered but has a powdery or granular configuration. If such a ribbon is wrapped, for example, upon an electrical conductor, a subsequent temperature treatment and sintering produces a welding of the edges of the ribbon to more or less fuse adjoining loops and/or multiply layer configurations to obtain in fact a more or less homogenous insulation.

A ribbon used in accordance with the invention for wrapping a conductor or a tube thus produces a very compact cover and due to the fusing it can be no longer compared with a conventional wrapping, but due to the uniform configuration, the hose-like cover becomes directly comparable with extruded or press worked insulation layers. The particular configuration of the ribbons in accordance with the invention permits with certainty edge welding during sintering which welding is not obtainable with ribbons having a rectangular cross section. The surface of a tubular element wrapped with overlapping loops of a ribbon of the type shown in FIGS. 1, 2 and 3 produces a welded, i.e. practically closed, surface and is thus very resisting against external temperatures including aggressive media and including high temperatures.

As such a ribbon is wrapped around elongated stock such as a conductor, a tube or the like, to be described in detail below, one has to consider that during wrapping the thicker central portion is stretched more than the edge portions. This is very beneficial for welding the edges of adjoining loops as well as of the central ribbon portion to a layer above or below, made in a similar fashion and under utilization of a similar type band or ribbon. The differential in stretching during the wrapping process causes, particularly during the subsequent sintering and, under consideration of a corresponding volume contraction, the band or ribbon as a whole, and particularly the central portion thereof, to be pressed firmly against any structure and strata underneath. The stronger (thicker) central zone of the ribbon, in accordance with the present invention, offers also another advantage over ribbons with uniform cross section. For obtaining similar wall thicknesses one needs a smaller number of layers so that, in total, the surface area or areas to be welded together is reduced. This, of course, reduces, for example, the danger of the inclusion of dirt particles or air bubbles. Thus, electrical conductors, tubes, or the like to be used, for example, for directly heating moist zones or for conducting or operating within oil, acid or alkaline baths, all very suitable for that purpose.

The ribbon is to be made, for example, of a polyimid either directly or in a blend, for example, with carbon black in order to impart semi-conductive properties upon the material. Polyimids are generally quite inert chemically and are highly resisting of high temperature. Particularly important, however, in this regard are synthetics which include fluorides. Thus, one may well use polytetrafluoroethylane, which when used as a conductor insulation provides highly beneficial electrical properties. It should be mentioned that polytetrafluoroehtylane is to include also tetrafluoroethylane-polymers which are provided with modifying additions, but in such quantities that the polymer, such as polytetrafluoroethylane itself, cannot be worked from a melt.

As far as utilizing the invention is concerned, any of the ribbons can be employed in the following manner. Assuming, for example, that unsintered ribbons are to be considered, the ribbon made from such a synthetic cannot be worked out of a melt, i.e. a synthetic of the type mentioned earlier, is wrapped in one or several layers upon the elongated stock with overlapping edges. Subsequently, the material is sintered under employment of suitable temperatures whereby the overlapping edges of adjacent overlapping loops, as well as layers above and/or below, are welded together in a gas and moistureproof configuration to obtain a compact, more or less homogenic cover with a smooth outer surface. Such compactness is, of course, not obtainable when one uses ribbons which are sintered before application.

In the case of utilizing ribbons for wrapping a mandrel, these ribbons again are assumed to be not sintered and not workable out of a melt and are wrapped with overlapping edges upon the mandrel serving as a carrier or support member. Subsequently the material is sintered at a suitable temperature whereby again the overlapping edges, as well as adjoining layers are bonded and welded to each other in a gas and moistureproof fashion so that one obtains a compact, tubular configuration which has quite homogenous wall structure and a smooth outer surface to thus produce tubes or hose as an element in its own right and is selfsupporting. The carrier and support mandrel can be removed after completion of sintering. One obtains profield sections, tubes, hoses or the like.

Whenever it is desired, any of these proceedings may be followed by a crosslinking process, for example, under utilization of high energy radiation.

Figure 2:
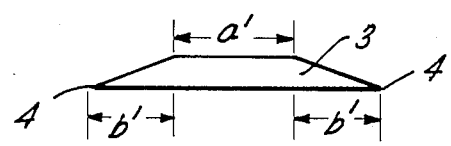
FIG. 2 is another cross section through a ribbon constituting an alternative form of the preferred embodiment.
Figure 3:
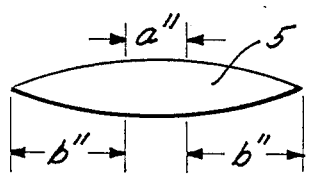
FIG. 3 is a cross section through a third alternative still constituting a preferred embodiment for practicing the present invention.
Figure 4:
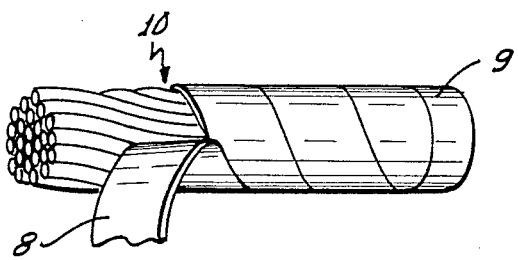
FIG. 4 is a side view of a cable electrically insulated with one of the ribbons shown in FIGS. 1 through 3.

After of these general remarks concerning the utilization and capability of the ribbons shown in FIGS. 1, 2 and 3, we proceed to the specifics of a first example, namely the electrical insulation of a conductor. FIG. 4 illustrates a multistrand conductor 6 composed of stranded together, bare tin-plated, silver-plated or nickel-plated, copper wires or filaments 7. The object is to provide, for example, this particular conductor with an insulation which resists oil and high temperatures. Therefore, a PTFE insulation is advisable. Moreover, the stranded conductor is highly flexible and that flexibility is not to be impaired by the insulation. Therefore, one uses a ribbon 8 made in any of the configurations shown in FIGS. 1, 2 and 3. This ribbon 8 is wrapped in a helical wrapping pattern with overlapping edges 10. A second layer 9 may have been wrapped on top of the first one. The orientation of the helical coil and the direction of pitch may differ for each layer. Moreover, additional ribbons of similar configuration may be wrapped on top of the first two mentioned ones, and so forth.

The degree of overlap of the edges depends upon the extent of the ranges such as b, b' and b" of declining cross section. One can restate this as follows: the overlap will depend upon the ratio of the width a to the width b. For example, if the central range a of the ribbon is less than one-third of the sum of the two width ranges b, one needs a high degree of overlap. This, then, points to the preferred fields of usage. A ribbon, such as shown in FIG. 2, with a large central area and relatively narrow edge zones b' will be used whenever the overlap is not to be very large.

The utilization of overlap and ribbon profiles, as well as other parameters, are chosen so that in the end one obtains a uniform cover surface. This will be particularly the case if unsintered band and ribbon is used and a sintering process follows the wrapping process. In this case, as stated, one does not only obtain a smooth outer surface, but several layers of ribbon fuse and establish a compact configuration.

FIG. 4 illustrates a stranded conductor configuration. The inventive method is applicable to individual conductors as well as to cable bundles, having one or several conductor layers, even using conventionally insulated conductors. The ribbon wrapping is useful in all these instances for a temperature resisting and strong cover.

It should be mentioned that for purposes of electrically insulating electrical machines, such as electromotors, German printed patent application No. 15 46 54 suggests ribbons which do not have a rectangular cross section. These ribbons are provided with paste and bonding agents and require large areas of contact, as well as cavities, for storing the paste or adhesive. Consequently, these known ribbons exhibit definite uneveness in longitudinal directions resulting in ribs or grooves. Particularly, these grooves or ribs facing down towards the object to be wrapped result in a stepped configuration, particularly in the edge zone, and particularly in conjunction with the paste or bonding agent. This is not a disadvantage in the case of electromachines because finally the coils and windings are cast into some material so that any original irregularities of the surface are unimportant. On the other hand, these known ribbons, particularly in the case of making highly flexible electrical conductors such as shown in FIG. 4 and using such conductors in a temperature range in excess of 200° C., one cannot use these known ribbons for purposes of insulation.

Figure 5:
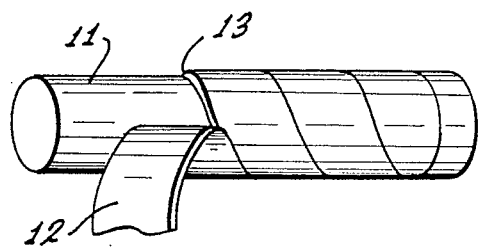
FIG. 5 is a similar side view showing application of the ribbon of the type shown in FIGS. 1 through 3 for wrapping a tube.

FIG. 5 illustrates utilization of any of the ribbons outlined above for covering a tube such as tube 11. It may be assumed that the tube is used for transporting a fluid, for example in a heat exchanger configuration, but alternatively a tube of the type shown in FIG. 5 may be physically combined with other similar tubes in order to obtain a tube bundle cable. In either case, the tube may, for example, be made of copper and the object is to protect this copper tube against an aggressive medium. The medium may be a liquid or a gas; it may be heated or cooled. The tube may be used in an environment in which it must be protected against aggressive medium, so that the copper for thee tube must be suitably resisting against these aggressions. In the chemical, or particularly in the petrochemical industry, one does need long tubes to run a heated medium, for example, from a point of production to an analyzing laboratory. The tube is constantly heated, for example, through separately embedded or otherwise provided heating conductors.

Depending upon the type of the material to be transported and considering the possibility of diffusion, for example, of moist chlorine, hydrochloric acid gas or phosgene through the wall of a conduit made from plastic materials into the interior of a tubular bundle, there is the danger that the included metallic heating conductor ribbon or a heating tube or a metallic tube included in the bundle for any other reason is attacked by diffused aggressive material of the type mentioned. Wherever diffusion out of a conduit is to be expected, a wrapping in accordance with the invention and as described above with reference to FIG. 5 insures that diffusion is avoided and corrosion will not occur. One should also mention that those objects which are subject to aggression could themselves be wrapped in the stated manner for purposes of obtaining long-lasting protection.

FIG. 5 can also be interpreted as illustrating the making of a self-contained tube in which case 11 can be construed to be a mandrel upon which the ribbon 12 is wrapped. The processing of fusing and including the providing of multiple layers can all be carried out as described. However, other than covering a tube as the final product, the mandrel will be removed subsequently leaving the multiplied tube as a self-contained tubular configuration.

I claim:

1. A conductor or cable having a cover comprising a helically wrapped, and thereby stretched, ribbon made of an unsintered powdery or granular synthetic, not amenable to working from a melt but having high temperature resistivity and being thicker in a central portion with tapering edges of reducing thickness and smooth surface, said ribbon having a thickness in its central area from 30 to 200 micrometers and a thickness at the edge region of 5 micrometers and less, adjacent loops of the wrapping overlapping at adjoining tapering edges, thermal sinter treatment subsequent to wrapping having caused fusing of the overlapping edges to result in an overall approximately smooth surface.

2. A wrapping on a cable, or conductor as in claim 1, said synthetic being a polymer containing fluorine, preferably polytetrafluor polymer.

3. Wrapping on a cable or conductor as in claim 1, wherein the edge width for overlapping and of reducing cross-sectional thickness is between 5 and 50 millimeters.

4. Wrapping as in claim 1 wherein said cable or conductor is an auxiliary support, there being a plurality of layers of such ribbons whose overlapping edges having been fused subsequent to wrapping to obtain a self-contained tubular configuration from which the support can be removed.

5. Wrapping on a cable or conductor as in claim 1 wherein said ribbon has a lens-shaped cross section.

6. Wrapping on a cable or conductor as in claim 1 wherein said ribbon has a trapezoidal cross section.

7. Wrapping on a cable conductor as in claim 1 wherein said ribbon has very flat declining edges.

8. Wrapping ribbon made of a temperature-resisting synthetic material not amendable to be worked from a melted consistency and having a cross section deviating from a rectangular configuration by a thicker central portion tapering toward the edges in a curved or straight configuration to assume a lense-shaped or trapezoidal cross section, the surface being smooth throughout, wherein the central portion is 30 to 200 micrometers thick, the edge thickness being not more than 5 micrometers.

9. Ribbon as in claim 8, wherein the central portion is 30 to 200 micrometers thick at a total width of the ribbon from 4 to 50 mm.

10. Ribbon as in claim 8, the central portion being from 60 to 180 micrometers thick, the width of the ribbon being from 10 to 30 mm, 11. Ribbon as in claim 8, the material being a high temperature synthetic.

* * * * *